United States Patent
Kurian et al.

(10) Patent No.: US 10,462,208 B2
(45) Date of Patent: Oct. 29, 2019

(54) FILE TRANSFER SYSTEM WITH DYNAMIC FILE EXCHANGE CONTROL FUNCTIONS

(71) Applicant: Bank of America Corporation, Charlotte, NC (US)

(72) Inventors: Manu Kurian, Dallas, TX (US); Paul Grayson Roscoe, Treuddyn Flintshire (GB); William J. McCann, Shirley, MA (US); Kevin L. Kralman, Seattle, WA (US); Thomas Sodano, New York, NY (US); Abhishek Amatya, New York, NY (US); Linda Smeraldi-Lopez, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 127 days.

(21) Appl. No.: 15/646,176

(22) Filed: Jul. 11, 2017

(65) Prior Publication Data

US 2019/0020709 A1 Jan. 17, 2019

(51) Int. Cl.
*H04L 29/08* (2006.01)
*G06N 20/00* (2019.01)
*H04L 29/06* (2006.01)

(52) U.S. Cl.
CPC ............ *H04L 67/06* (2013.01); *G06N 20/00* (2019.01); *H04L 67/18* (2013.01); *H04L 67/2804* (2013.01); *H04L 63/0281* (2013.01)

(58) Field of Classification Search
CPC . H04L 67/06; H04L 67/2804; H04L 63/0281; H04L 67/18; G06N 20/00
See application file for complete search history.

(56) References Cited

U.S. PATENT DOCUMENTS 7,660,902 B2 * 2/2010 Graham .............. G06F 21/6245
 709/203
7,761,393 B2 7/2010 Macbeth et al.
(Continued)

OTHER PUBLICATIONS

Aurangzeb Khan et al., "A Review of Machine Learning Algorithms for Text-Documents Classification", Journal of Advances in Information Technology, vol. 1, No. 1, Feb. 2010, 17 pages, downloaded from <http://www.jait.us/uploadfile/2014/1223/20141223050800532.pdf>.

(Continued)

*Primary Examiner* — Hai V Tran
(74) *Attorney, Agent, or Firm* — Banner & Witcoff, Ltd.; Michael A. Springs

(57) ABSTRACT

Systems for dynamically controlling file transfers are provided. In some examples, a system, may receive a request to transfer a file from a first location to a second location. Prior to transferring the file, the file may be evaluated to determine whether one or more dynamic controls should be implemented. If dynamic controls should be implemented, the file may be transferred from the first location to a file distribution control computing system until an instruction to transfer the file is executed. The system may identify one or more dynamic controls to implement based on one or more machine learning datasets. In response to implementing the dynamic controls, additional data may be received. If the additional data fulfills the one or more dynamic controls, the file may be released and an instruction to transfer the file to the second location may be generated, transmitted and/or executed. In some examples, transfer may be to multiple downstream locations.

20 Claims, 10 Drawing Sheets

(56) References Cited

U.S. PATENT DOCUMENTS

| | | | |
|---|---|---|---|
| 8,958,605 B2 | 2/2015 | Amtrup et al. | |
| 9,015,082 B1 | 4/2015 | Jaiswal et al. | |
| 9,058,515 B1 | 6/2015 | Amtrup et al. | |
| 9,058,580 B1 | 6/2015 | Amtrup et al. | |
| 9,177,261 B2 | 11/2015 | DiCorpo et al. | |
| 9,483,794 B2 | 11/2016 | Amtrup et al. | |
| 2007/0226368 A1* | 9/2007 | Strickland | G06Q 30/02 709/243 |
| 2009/0287995 A1* | 11/2009 | Tsao | B66C 1/422 715/234 |
| 2012/0005310 A1* | 1/2012 | Obata | G06F 9/45537 709/219 |
| 2012/0110667 A1* | 5/2012 | Zubrilin | G06F 21/56 726/24 |
| 2018/0365436 A1* | 12/2018 | Shitrit | G06F 21/606 |

OTHER PUBLICATIONS

"Google DeepMind Teaches Artifical Intelligence Machines to Read", MIT Technology Review, Jun. 17 2015, downloaded on Jul. 6, 2017 from <https://www.technologyreview.com/s/538616/google-deepmind-teaches-artificial-intelligence-machines-to-read/>.

Harry Surden, "Machine Learning and Law", Washington Law Review, vol. 89:87, 2014, downloaded from <https://digital.law.washington.edu/dspace-law/bitstream/handle/1773.1/1321/89WLR0087.pdf>.

* cited by examiner

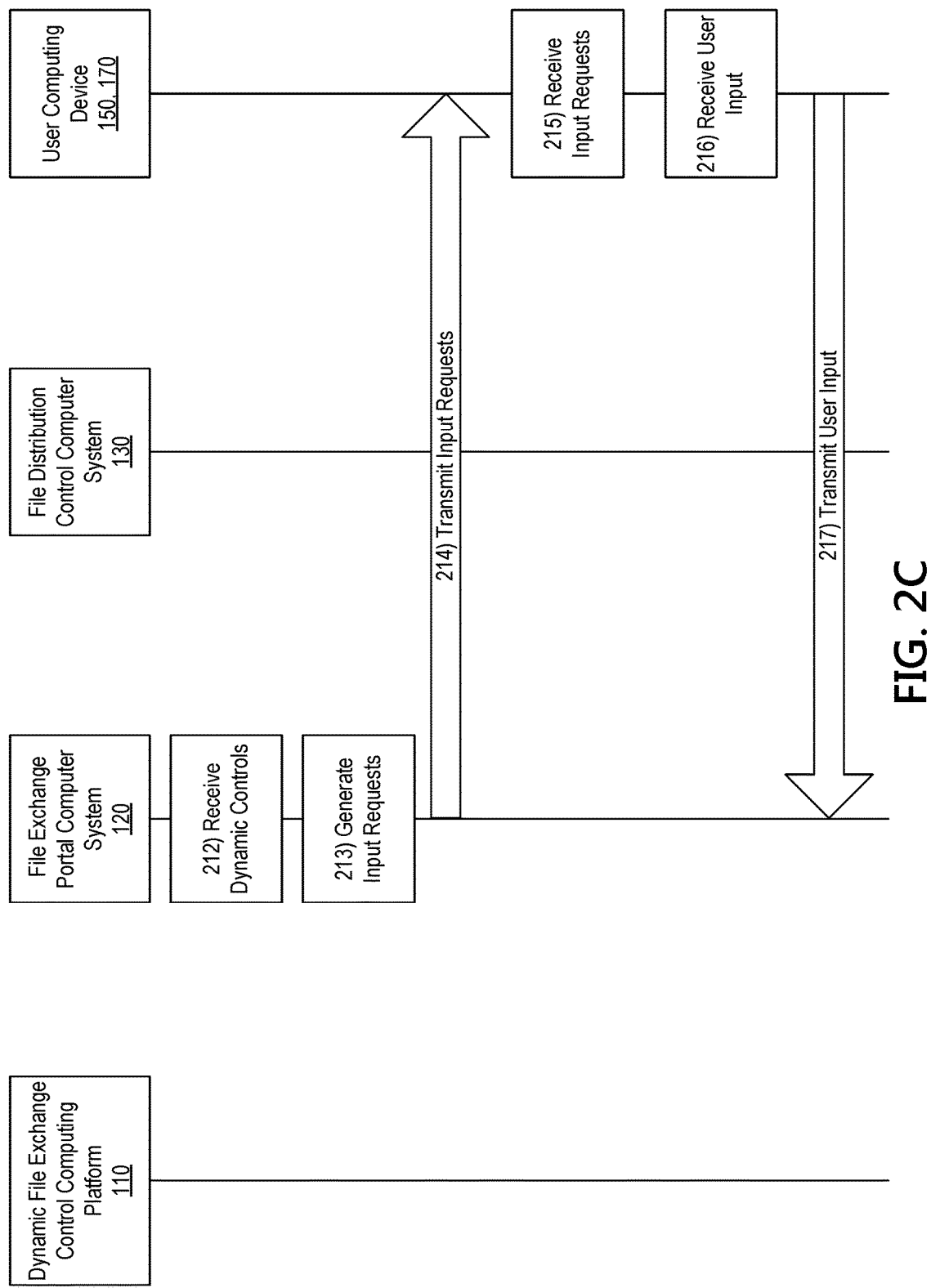

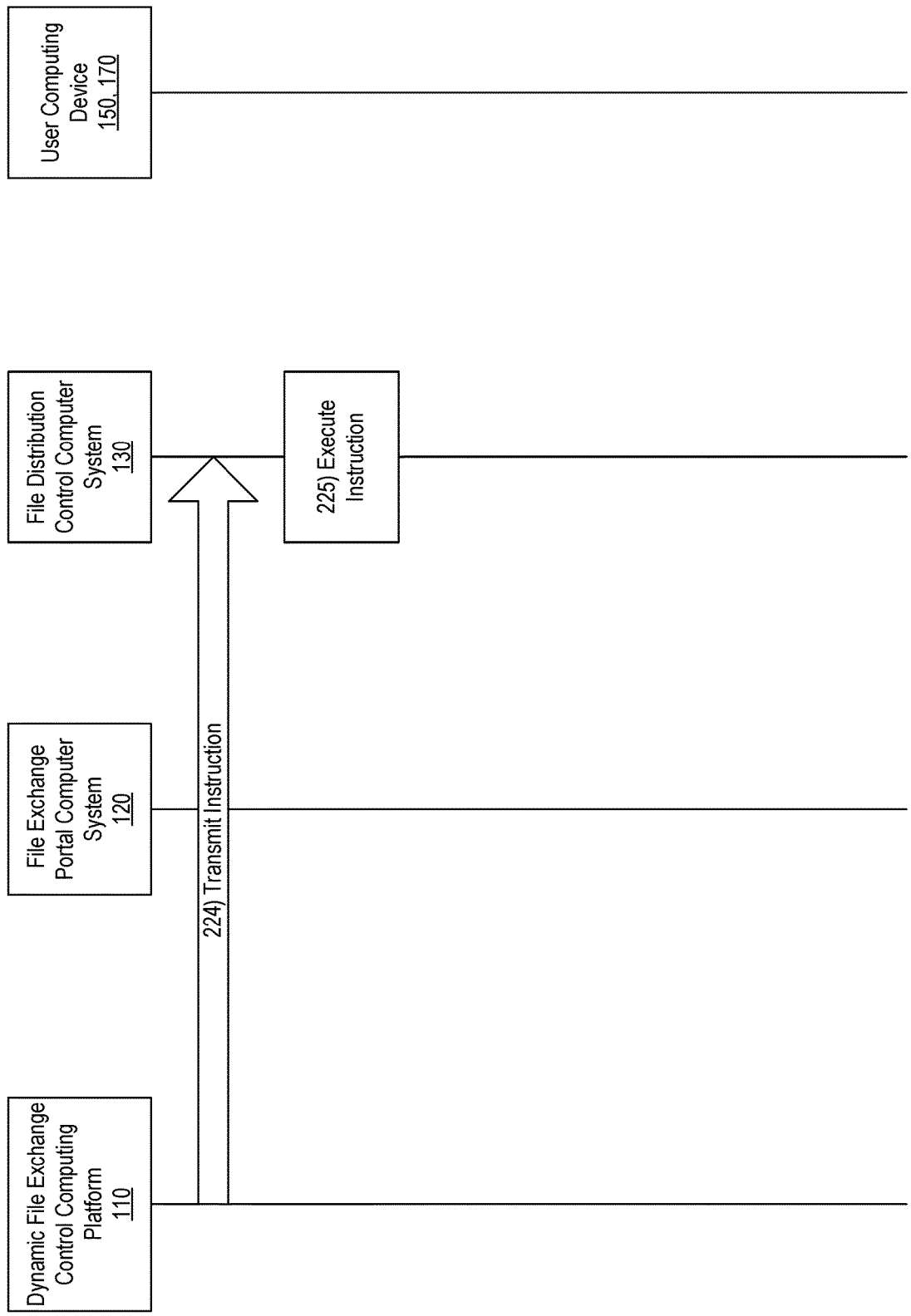

FILE TRANSFER SYSTEM WITH DYNAMIC FILE EXCHANGE CONTROL FUNCTIONS

BACKGROUND

Aspects of the disclosure relate to electrical computers, systems, and machine learning. In particular, one or more aspects of the disclosure relate to implementing dynamic file exchange control functions.

Data transfers, file transfers, and the like, are part of day-to-day functions. However, transferring files can expose the data within those files to risk of loss. In addition, it is often difficult to control files that related to subject matter governed by one or more regulatory bodies, or require approval, or the like. Conventional methods of controlling distribution of documents with sensitive or private information are often cumbersome and can cause unnecessary delays due to deficiencies in systems performing the transfers, monitoring the data, and the like. Accordingly, controlling file exchanges with dynamic file exchange functions would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with controlling file transfers, ensuring data is secure, ensuring necessary regulatory requirements are met, ensuring proper approvals are received, and the like.

In some examples, a system, computing platform, or the like, may receive a request to transfer a file from a first location to a second location. Prior to transferring the file to the second location, one or more aspects of the file may be evaluated to determine whether one or more dynamic controls should be implemented. In some examples, a type of file, content of file, whether the file is pre-registered for dynamic controls, and the like, may be used to determine whether one or more dynamic controls should be implemented.

In some examples, if one or more dynamic controls should be implemented, the file may be transferred from the first location to a file distribution control computing system or device. The file may be held by the file distribution control computing system until an instruction to transfer the file is received or executed.

If one or more dynamic controls should be implemented, the system may identify one or more dynamic controls to implement. In some examples, the system may identify one or more dynamic controls based on one or more machine learning datasets that may link one or more appropriate controls to various aspects, features, and/or characteristics of the file or document for which the transfer is requested.

The one or more identified dynamic controls may then be implemented. In response, additional data, approvals, and the like, may be received by the system. If the additional data, approvals, and the like, fulfill the one or more dynamic controls, the file may be released and an instruction to transfer the file to the second location may be generated, transmitted and/or executed (e.g., the file may be transferred from the file distribution control computing device to the requested second location).

If the identified one or more dynamic controls are not fulfilled, the system may continue to hold the file in the file distribution control computing device until it is released.

In some examples, dynamic controls may include features associated with editing of documents, approving file transfers, revision storage, tracking of edits, transfers, or revisions for auditing purposes, automatic proxy functions, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing dynamic file exchange control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to identify one or more dynamic file exchange control functions in order to protect secure data, ensure compliance with regulatory bodies, and the like.

In many businesses, file transfers are performed using secure methods but still leave the data vulnerable to loss. Further, it can be difficult to control file transfers, avoid unauthorized transfers, ensure data associated with a file transfer meets one or more regulatory guidelines, and the like.

Accordingly, aspects described herein provide for dynamic, multi-level access, governance, review, editing, and auditing functions. The aspects described herein relate to systems for quarantining one or more files for which a file transfer has been requested (e.g., prior to transferring the file to the requested location) in order to ensure that the file transfer is approved, that data contained within the document is secure, that private information is maintained as private, that revisions made are tracked and the like. In some examples, the system may identify and implement one or more dynamic controls that must be fulfilled prior to the file being released for transfer to the requested second location. In some examples, the dynamic controls may be identified based on one or more machine learning datasets.

Various aspects described herein will be described in the context of a file or file transfer. However, the transfers may include data strings, packets and/or envelopes transferred via files, messages, web services, or the like, without departing from the invention.

By requiring fulfillment of the one or more dynamic controls, the system may ensure file transfers are, for instance, appropriately approved and include secure, appropriate data prior to transferring the file to the requested location.

These and various other arrangements will be discussed more fully below.

Figure 1A:
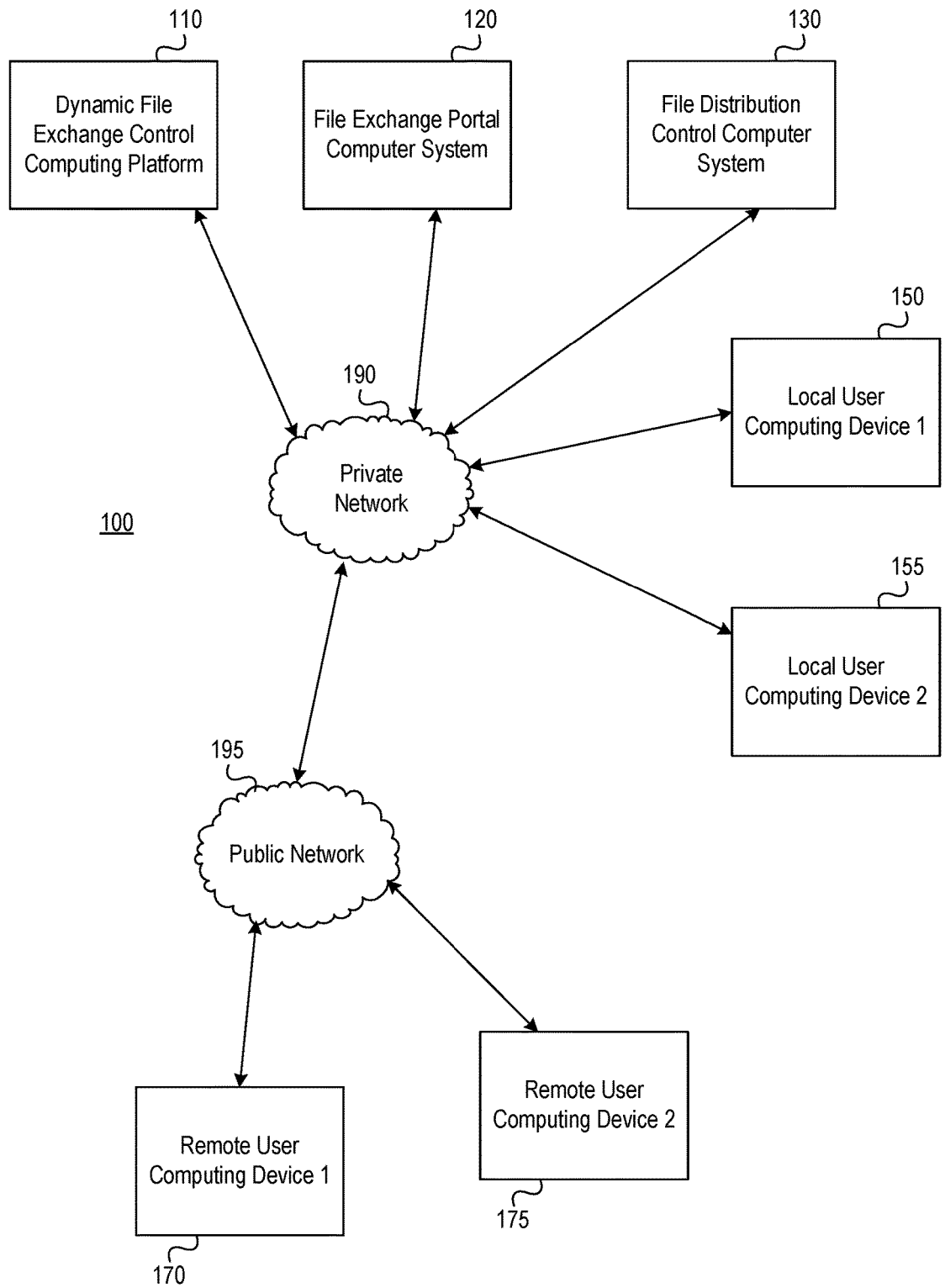
FIGS. 1A and 1B depict an illustrative computing environment for implementing dynamic file exchange control functions in accordance with one or more aspects described herein.
Figure 1B:
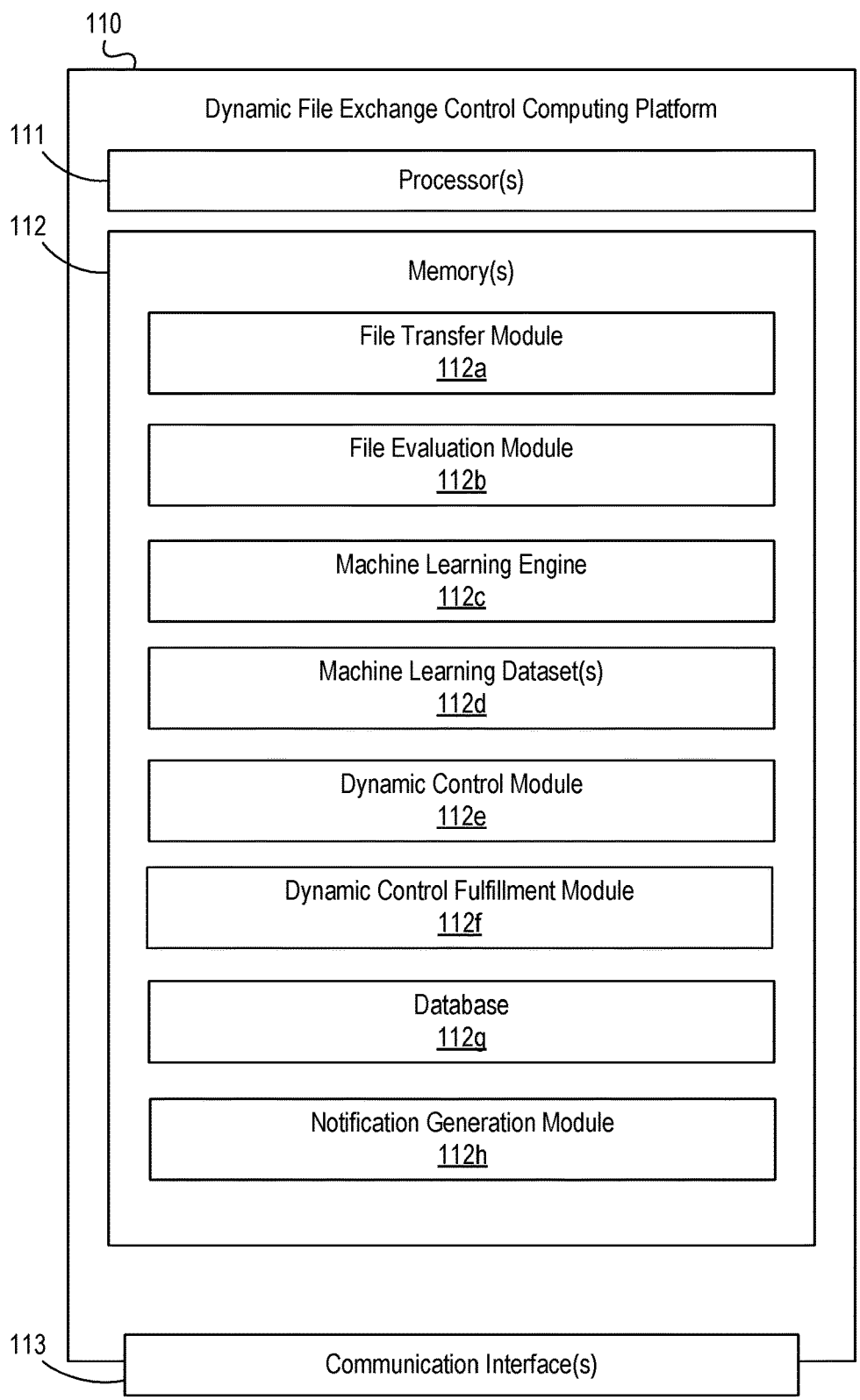

FIGS. 1A and 1B depict an illustrative computing environment for implementing and using a dynamic file exchange control system in accordance with one or more aspects described herein. Referring to FIG. 1A, computing environment 100 may include one or more computing devices and/or other computing systems. For example, computing environment 100 may include a dynamic file exchange control computing platform 110, a file exchange portal computer system 120, a file distribution control system 130, a first local user computing device 150, a second local user computing device 155, a first remote user computing device 170, and a second remote user computing device 175.

Dynamic file exchange control computing platform 110 may be configured to host and/or execute a machine learning engine to provide dynamic file exchange and distribution control functions. In some examples, a request to transfer a file from a first location to a second location (e.g., a computing device or file storage location associated with a first user to a computing device or file storage location associated with a second user) may be received by the dynamic file exchange computing platform 110. The file may be evaluated to determine one or more characteristics of the file. Based on the characteristics, one or more dynamic file controls may be implemented. In some examples, the dynamic file controls may be identified and/or implemented based on one or more machine learning datasets. In some examples, the file may be transferred from the first location to a computer system configured to hold the file while the dynamic controls are fulfilled (e.g., file distribution control computer system 130). For instance, prior to transferring the file to the second location, the file may be transferred to the file distribution control computer system 130 and may be held there until one or more dynamic controls are fulfilled.

Although several aspects described herein relate to transfer of a file from a first location to a second location, in some examples, the file (or portions thereof) may be transferred to more than one receiving location (e.g., a third location, a fourth location, and the like). Accordingly, while aspects described herein relate to transfer to a second location, nothing in the application should be viewed as limiting the transfer to only a second location. Rather, the "second location" as used herein may include a plurality of locations (e.g., the file may be transferred to multiple receiving locations). In some examples, dynamic controls may be implemented for all receiving locations in a first instance. In other examples, dynamic controls may be implemented at different stages of the transfer (e.g., before transfer from a first location to a second location, after transfer to the second location and before transfer to a third location, and the like).

In some examples, one or more users may interface with dynamic file exchange computing platform 110 via a file exchange portal computer system 120 accessed from one or more of first local user computing device 150, second local user computing device 155, first remote user computing device 170, and/or second remote user computing device 175. The file exchange portal computer system 120 may include one or more computing devices configured to provide one or more file exchange portal interfaces to one or more end user devices. For example, file exchange portal computer system 120 may be configured to provide a user portal, such as a portal for requesting file transfers, to one or more users associated with an entity implementing the systems described herein, such as a financial institution, government entity, university, corporate entity, or the like. The file exchange portal computer system 120 may be configured to authenticate one or more users, one or more user requests, and the like. The file exchange portal computer system 120 may also be configured to transmit and/or receive instructions from dynamic file exchange computing platform 110, transmit one or more notifications, and the like. Accordingly, the file exchange portal computer system 120 may provide users with one or more interfaces configured to facilitate requests for file transfers, and the like.

Although the file exchange portal computer system 120 is shown and described as a separate computing device or devices, in some examples, the file exchange portal computer system 120 may be part of the dynamic file exchange control computing platform 110 (e.g., a same physical device), and/or file distribution control computer system 130.

File distribution control computer system 130 may include one or more computing devices configured to transmit and/or receive files for which a transfer request has been received. The file distribution control computer system 130 may also be configured to receive one or more signals, instructions, and/or commands from, for example, dynamic file exchange computing platform 110. The signals, instructions, and/or commands may include signals, instructions, and/or commands to hold a file received by the file distribution control computer system 130 until another instruction is received, to transmit or transfer a file to a particular location, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be used to communicate with, for example, dynamic file exchange control computing platform 110, request a file transfer, provide information or input used to determine whether one or more dynamic controls have been fulfilled, receive and display notifications, and the like, as will be discussed more fully herein.

In one or more arrangements, file exchange portal computer system 120, file distribution control computer system 130, local user computing device 150, local user computing device 155, remote user computing device 170, and/or remote user computing device 175 may be any type of computing device or combination of devices capable of performing the particular functions described herein. For example, file exchange portal computer system 120, file distribution control computer system 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of file exchange portal computer system 120, file distribution control computer system 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic file exchange control computing platform 110. As illustrated in greater detail below, dynamic file exchange control computing platform 110 may include one or more computing devices configured to perform one or more of the functions described herein. For example, dynamic file exchange control computing platform 110 may include one or more computers (e.g., laptop computers, desktop computers, servers, server blades, or the like).

As mentioned above, computing environment 100 also may include one or more networks, which may interconnect one or more of dynamic file exchange control computing platform 110, file exchange portal computer system 120, file distribution control computer system 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic file exchange control computing platform 110, file exchange portal computer system 120, file distribution control computer system 130, local user computing device 150, and local user computing device 155 may be associated with an organization (e.g., a financial institution), and private network 190 may be associated with and/or operated by the organization, and may include one or more networks (e.g., LANs, WANs, virtual private networks (VPNs), or the like) that interconnect dynamic file exchange control computing platform 110, file exchange portal computer system 120, file distribution control computer system 130, local user computing device 150, and local user computing device 155 and one or more other computing devices and/or computer systems that are used by, operated by, and/or otherwise associated with the organization. Public network 195 may connect private network 190 and/or one or more computing devices connected thereto (e.g., dynamic file exchange control computing platform 110, file exchange portal computer system 120, file distribution control computer system 130, local user computing device 150, and/or local user computing device 155) with one or more networks and/or computing devices that are not associated with the organization. For example, remote user computing device 170 and remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., dynamic file exchange control computing platform 110, file exchange portal computer system 120, file distribution control computer system 130, local user computing device 150, and/or local user computing device 155).

Referring to FIG. 1B, dynamic file exchange control computing platform 110 may include one or more processors 111, memory 112, and communication interface 113. A data bus may interconnect processor(s) 111, memory 112, and communication interface 113.

Communication interface 113 may be a network interface configured to support communication between dynamic file exchange control computing platform 110 and one or more networks (e.g., private network 190, public network 195, or the like). Memory 112 may include one or more program modules having instructions that when executed by processor(s) 111 cause dynamic file exchange control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic file exchange control computing platform 110 and/or by different computing devices that may form and/or otherwise make up dynamic file exchange control computing platform 110.

For example, memory 112 may have, store, and/or include a file transfer module 112a. File transfer module 112a may store instructions and/or data that may cause or enable the dynamic file exchange control computing platform 110 to generate and/or transmit one or more signals, commands or instructions to transfer a file from a first location to a file distribution control computer system 130, to a second location, and the like. In some examples, the file transfer module 112a may receive a request to transfer a file from a first location to a second location. Based on evaluation of the file (as performed by various modules) the file transfer module 112a may transmit a file (if the file has been received), may generate and/or transmit one or more instructions to a first location of the file (e.g., local user computing device 150, remote user computing device 170, other computing device, or the like) to transfer the file to the file distribution control computer system 130 to be held pending an outcome of one or more dynamic controls, and the like.

Memory 112 may further have, store and/or include a file evaluation module 112b. File evaluation module 112b may store instructions and/or data that may cause or enable the dynamic file exchange control computing platform to evaluate one or more files for which a file transfer request has been received. Evaluating the one or more files may include analyzing metadata associated with each file to determine one or more characteristics of the file. Some example metadata components that may be captured and considered may include file checksum, encryption fingerprint, file validations, and the like. Various other components may be used without departing from the invention.

Additionally or alternatively, each file may be evaluated to determine a content of the file (e.g., whether the file includes sensitive information, whether the file relates to regulatory issues, whether the file includes one or more standard form documents, a version of the file, whether approval is required for files of this type or including data of a type contained within the file, and the like. In some arrangements, biometric, geo-data, and other data points may be used to authenticate, validate, and the like. In some examples, the file evaluation module 112b may use one or more machine learning datasets 112e generated by a machine learning engine 112d in evaluating each file.

As mentioned above, the dynamic file exchange control computing platform 110 may further have, store, and/or include a machine learning engine 112c and machine learning datasets 112d. Machine learning engine 112c and machine learning datasets 112d may store instructions and/or data that cause or enable dynamic file exchange control computing platform 110 to generate evaluate one or more files for which a transfer request has been received, determine whether one or more dynamic controls should be implemented for a file, identify one or more dynamic controls to be implemented, and the like. The machine learning datasets 112d may be generated based on analyzed data (e.g., data from previous file transfers, data from social media sites, and the like), raw data, and/or received from one or more outside sources.

The machine learning engine 112c may receive data (e.g., data collected from a plurality of sources) and, using one or more machine learning algorithms, may generate one or more machine learning datasets 112d. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

The machine learning datasets 112d may include machine learning data linking one or more files, file types, file contents, metadata components, regulatory requirements, form numbers, user names, and the like, to one or more appropriate dynamic controls. For instance, data from previous file transfers (e.g., authentications required, types of documents, editing performed, version tracking, contents, users associated with a document, and the like) may be analyzed to generate one or more machine learning datasets 112d that may be used to determine one or more appropriate dynamic controls for a particular file.

The machine learning datasets 112d may be updated and/or validated based on the data associated with a current and one or more future file transfers (e.g., from data collected after evaluation and transfer of a file). For instance, as additional data is received, the machine learning datasets 112d may be validated and/or updated based on the newly received information. Accordingly, the system may continuously refine recommendations, dynamic controls, and the like.

The machine learning datasets 112d may be used by, for example, a dynamic control module 112e. Dynamic control module 112e may store instructions and/or data that may cause or enable the dynamic file exchange control computing platform 110 to determine one or more dynamic controls to be implemented for the file for which the transfer request has been received. For instance, dynamic control module 112e (in some examples, in conjunction with file evaluation module 112b) may compare characteristics of, data from, and the like, the file for which the transfer has been requested to one or more machine learning datasets to determine one or more appropriate dynamic controls to implement. For instance, dynamic controls may include one or more levels of or types of approval, one or more edits, retrieving one or more types of data for audit reporting, one or more version reporting, one or more auto-proxying capabilities, one or more notarizing capabilities, and the like.

Based on the one or more dynamic controls identified, the file transfer module 112a may instruct the file distribution control computer system 130 to hold the file for which transfer has been requested. However, if no dynamic controls are identified or implemented, the file transfer module 112a may generate and/or transmit an instruction to transfer or transmit the file to the requested second location.

If one or more dynamic controls have been identified and/or implemented, the dynamic file exchange control computing platform 110 may request and/or receive additional information in order to fulfill the one or more dynamic controls. In some examples, one or more requests for approval, additional information, or the like, may be generated and/or transmitted to the file exchange portal computer system 120 for distribution to one or more users. In some examples, notifications may be generated by a notification generate module 112h and may be transmitted to file exchange portal computer system 120 and/or to one or more user computing devices (e.g., devices 150, 155, 170, 175).

Upon receiving information in response to a request (e.g., a request for authorization or approval, a request for additional information, and the like) the dynamic file exchange control computing platform 110 may evaluate the received information. For instance, memory 112 may have, store, and/or include a dynamic control fulfillment module 112f. The dynamic control fulfillment module 112f may store instructions and/or data that may cause or enable the dynamic file exchange control computing platform 110 to evaluate the received information to determine whether it meets one or more criteria to fulfill the one or more dynamic controls associated with the file. For instance, if approval from two users is required, the dynamic control fulfillment module 112f may evaluate approvals received to determine whether there are approvals from two users, whether the users are authorized to approve file transfers, and the like. If so, the dynamic control may be considered fulfilled and data associated with the dynamic control may be modified to indicate that the control for this file has been fulfilled. If not, the system may wait for additional information, may transmit another request for information, or the like.

In some examples, receipt of insufficient information to fulfill the dynamic control may cause the file transfer module 112a to generate and/or transmit an instruction to file distribution control computer system 130 to continue to hold the file for which transfer has been requested. In other examples, the file distribution control computer system 130 may automatically hold a file for which transfer has been requested until an instruction is received to transfer or transmit the file.

Upon determining that all dynamic controls have been fulfilled, the file transfer module 112*a* may generate and/or transmit an instruction, signal or command to transfer or transmit the file from the first location to the requested second location. In some examples, the instruction may be transmitted to the file distribution control computer system 130 and the file distribution control computer system 130 may execute the instruction and initiate the file transfer.

Dynamic file exchange control computing platform 110 may further include one or more databases 112*g*. The one or more databases 112*g* may store information related to previous file transfers, dynamic controls implemented, tracking information associated with one or more file transfers, and the like.

FIGS. 2A-2E depict an illustrative event sequence for implementing and using dynamic file exchange control functions in accordance with one or more aspects described herein. The events shown in the illustrative event sequence are merely one example sequence and additional events may be added, or events may be omitted, without departing from the invention.

Figure 2A:
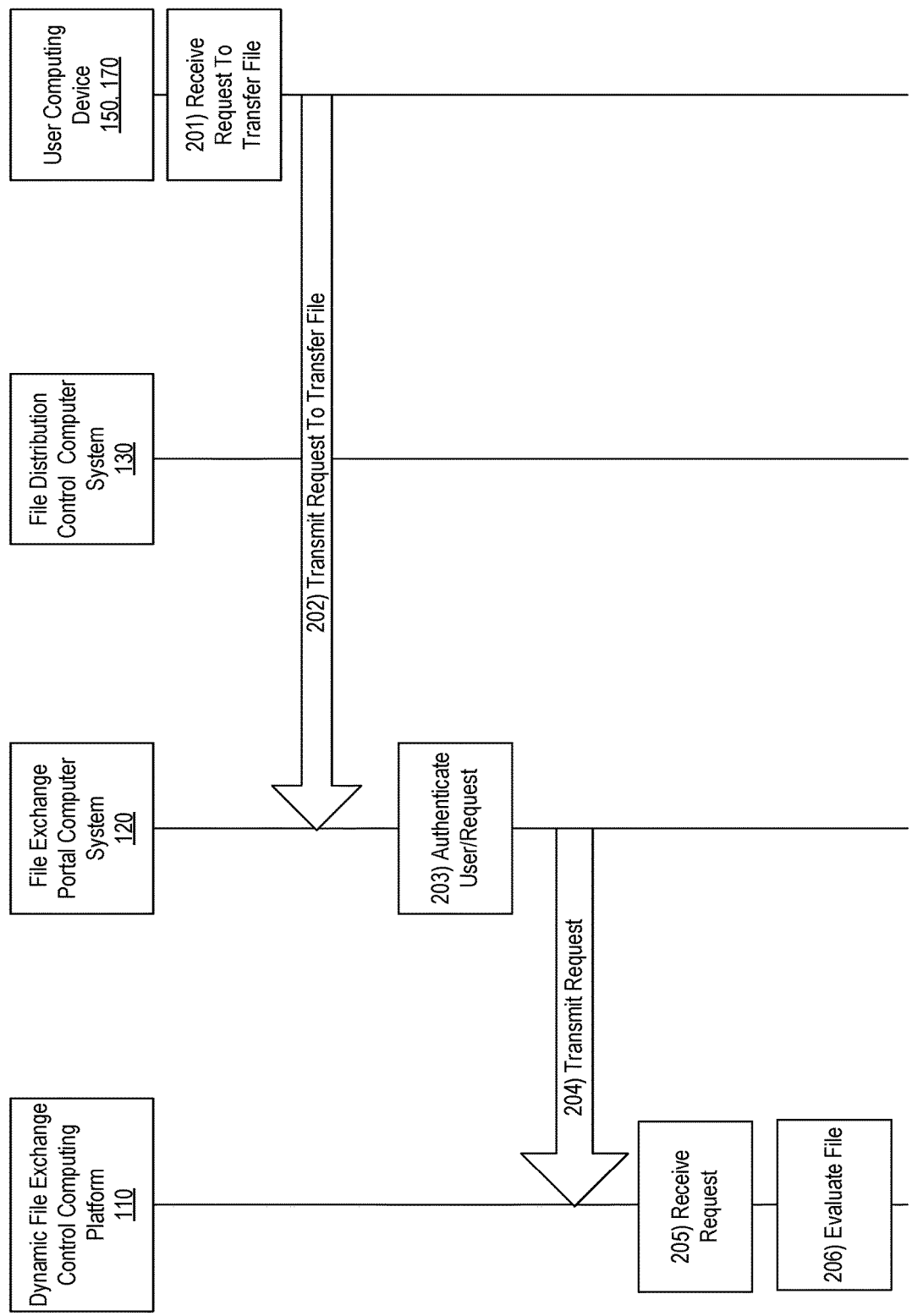

Referring to FIG. 2A, at step 201, a request for a file transfer from a first location to a second location may be received. The request may be received via a user computing device (such as device 150, 170, or the like). In some examples, the request may include the file for which transfer is requested. The request may include identification of the second location to which the file is being transferred. The request may also include additional information associated with a user requesting the file transfer, a recipient user of the file transfer, a type of file, type of data within the file, and the like.

In step 202, the file transfer request may be transmitted to the file exchange portal computer system 120. For instance, the user may input the request via his or her user computer device 150, 170 via a portal provided via the file exchange portal computer system 120. In step 203, the user requesting the file transfer may be authenticated via the portal. For instance, the user may provide credentials such as a username and password, biometric data, or the like, to authenticate and enable functionality of the system.

In step 204, upon authenticating the user requesting the file transfer (and/or the file transfer) the request may be transmitted to the dynamic file exchange control computing platform 110. In step 205, the request may be received by the dynamic file exchange control computing platform 110. In some examples, receiving the request may enable and/or activate functionality of the dynamic file exchange control computing platform 110.

In step 206, the file for which transfer is requested may be evaluated. As discussed herein, evaluating the file may include determining a type of file, content of the file, whether the content relates to one or more regulations, and the like. In some examples, evaluating the file may include evaluating criteria of the file to determine whether it meets criteria for dynamic controls. For instance, the file may be evaluated to determine whether it includes sensitive information, whether the file content, file type, or the like, requires approval prior to transfer, whether it relates to one or more regulatory issues, or the like. If so, it may be further processed to determine whether one or more dynamic controls should be implemented. If not, in some examples, the file transfer may be executed and the file may be transferred from the first location to the requested second location.

Figure 2B:
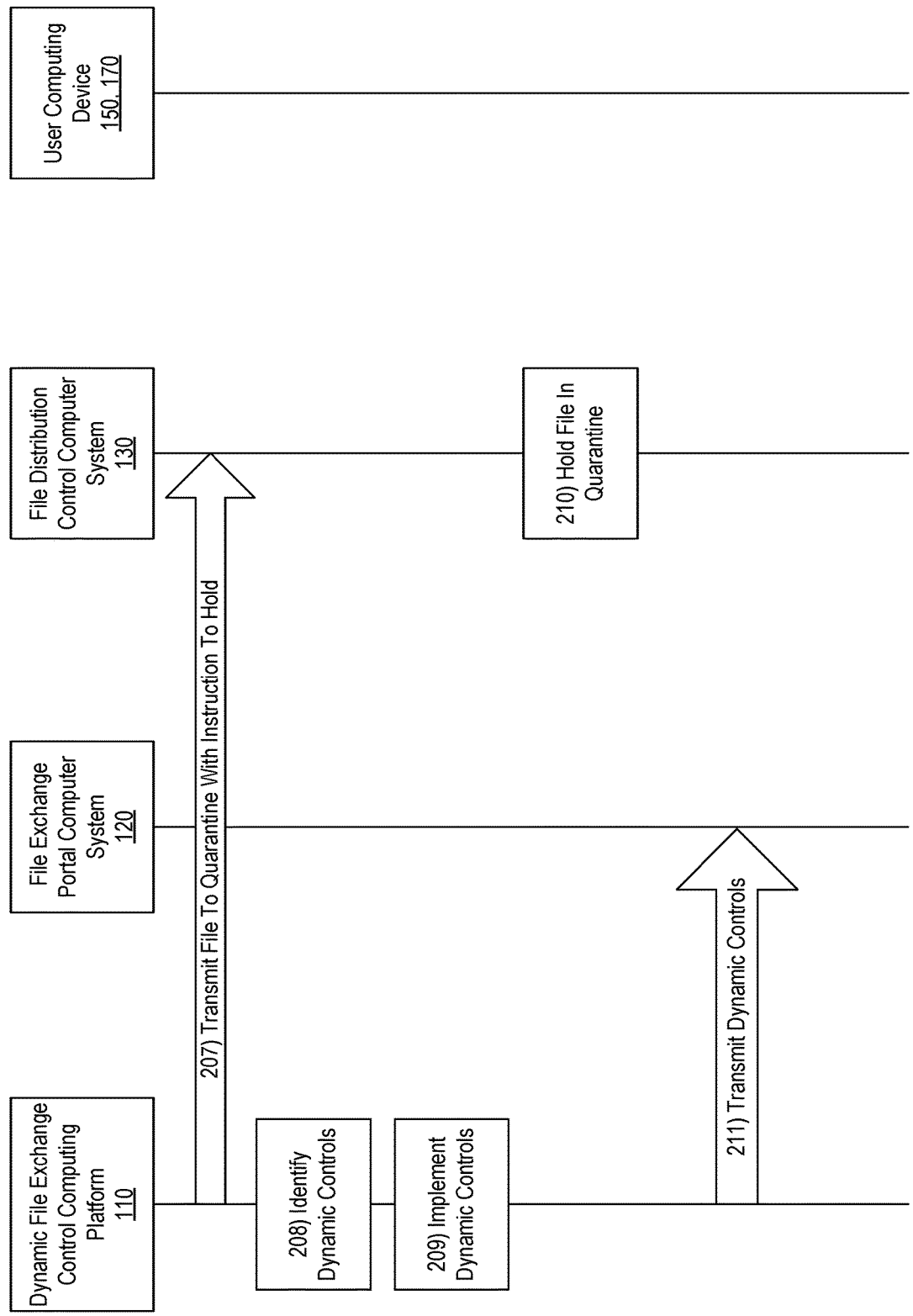

With reference to FIG. 2B, in step 207, the file may be transferred to a file distribution control computer system 130. In some examples, the file may be transferred to the file distribution control computer system 130 in response to determining (e.g., based on the file evaluation) that one or more dynamic controls should be implemented. Transferring the file to the file distribution control computer system 130 may include transmitting with the file an instruction to hold the file (e.g., an instruction preventing any subsequent transfer of the file) until an instruction is received to release the file. In some arrangements, transferring the file to the file distribution control computer system 130 may include physically transferring the file to a separate device or separate database or other data store within a device or system (e.g., dynamic file exchange control computing platform 110). In other examples, transferring the file to the file distribution control computer system 130 may include flagging the file in a current location (e.g., the first location from which the transfer is requested, a storage location within the dynamic file exchange control computing platform, and the like) as requested for transfer and preventing any physical transfer of the file until an instruction is received releasing the file for transfer.

In step 208, one or more dynamic controls may be identified. As discussed herein, the one or more dynamic controls may be identified using one or more machine learning datasets. In some examples, the one or more dynamic controls to be implemented may be identified using the machine learning datasets and based on metadata extracted from the file. For instance, metadata related to users associated with the file, approval requirements, biometric data, and the like, may be extracted and compared to one or more machine learning datasets to determine one or more dynamic controls to implement.

In some examples, dynamic controls may include one or more approvals or approval requirements or functions. For instance, based on metadata, content of the file, or the like, the computing platform 110 may identify one or more approval requirements that must be met prior to transfer of the file. In some examples, the approval(s) may be horizontal (e.g., a peer of the person requesting transfer may approve) and/or vertical (e.g., one or more supervisors of the person requesting transfer may approve). In some instances, may be conducted in serial (e.g., approvals may be required in series) or in parallel (e.g., all approvers may approve in parallel). For instance, the system may determine that three junior level users must approve while two senior level users must approve. In some examples, the junior level users may approve in parallel. Once the junior level users have approved, the senior level users may be asked to approve. The senior level users may also approve in parallel with each other but the senior level users may approve in series with the junior level users.

Further, in some examples, the approvals may include a plurality of users who may qualify as approvers and may require a certain number of that plurality (e.g., a quorum) to approve the document. For example, if five users are identified as qualified to approve a transfer, document, or the like, the one or more machine learning datasets may determine that at least three of the five must approve the file, transfer, or the like, in order to consider the dynamic control met. Accordingly, upon receiving approval from three of the five, the file, transfer, or the like, may be considered approved.

In some examples, use of a quorum of individuals may also be applied to other dynamic controls, such as editing, reviewing, and the like.

In some arrangements, an amount of funds associated with the file (e.g., amounts contained within a contract), an amount of funds associated with an account of a user associated with the file, or the like, may be used to determine type of approval (e.g., horizontal, vertical) and/or number of approvals (e.g., 1, 2, 4, or the like) required.

In some examples, dynamic controls may include one or more auditing controls. For example, one or more machine learning datasets may be used to identify channels, approvals, or the like, for which a dynamic control was not fulfilled, not fulfilled within a predefined time period, or the like, and may record that for future use. Accordingly, channels, approvals, or the like, not fulfilled or not promptly fulfilled may be adjusted to avoid delays.

In some arrangements, dynamic controls may include editing functions. For instance, the one or more machine learning datasets may be used to identify portions of the file being transferred that are not necessary to be transferred and may remove those portions and transmit only the portions deemed necessary. Accordingly, this may limit the expose of data being transferred. In some examples, the portions deemed necessary for transfer may be used to generate a new document (e.g., the portions may be extracted from a first document associated with the file transfer request and a second, different document may be generated including the extracted portions and, in some examples, only the extracted portions without the portions deemed unnecessary). In some examples, the extracted portions (e.g., including any comments, edits or revisions made by the user to whom they were transferred) may be rejoined with the portions not extracted to generate a final version of the document or for final processing.

In another example, the machine learning datasets may be used to identify portions of the file being transferred that might not be necessary to view and may obscure those portions. In some arrangements, a second, new document may be generated with the portions obscured. In other examples, the file may be modified to obscure the portions desired and transmitted. For instance, if a document is being transferred to a user for review of some pages but other pages or portions are not relevant to the user, the pages or portions not relevant to that user may be obscured when the file is sent to the user. However, after the user reviews the file, the portions obscured may be made visible again in a final version of the document or for final processing. In still other examples, machine learning datasets may be used to identify significant portions of the content of the file being transferred and may highlight those portions. For instance, the system may identify a signature page and may highlight that to draw attention to the portion in which a user must sign.

In still another example, machine learning datasets may be used to split a file or extract portions of a file for distribution to different entities (e.g., during inter-process work) and then may recombine the portions for final processing. For instance, one or more machine learning datasets may determine that one or more pages or portions of a document should be transferred to user A for review and/or editing, while one or more pages or portions should be transferred to user B for review and/or editing. Accordingly, the system may generate new documents and a document including the one or more portions for user A may be transferred to user A, while the document including the one or more pages for user B may be transferred to user B. After review and/or editing by the users, each document may be transferred back to the system (e.g., including edits, remarks, or the like) and may be rejoined to create a new document (or update/modify the original document to include any edits, revisions, or the like) for final processing.

In some arrangements, one or more machine learning datasets may be used to aggregate data, consolidate data from various sources, and provide inline organization. In some examples, the machine learning datasets may be used with metadata and other data content to perform these functions.

In some arrangements, dynamic controls may include review functions. For instance, one or more machine learning datasets may be used to review content of the file being transferred to determine whether the information is accurate. For instance, if the file being transferred refers to a regulation, and the regulation was recently updated, the system may flag the regulation in the file and may request addition review or correction. The system may also determine whether names within the file are correct, dates are correct, and the like.

In some examples, dynamic controls may include one or more revision control functions. For instance, each time the file being transferred is modified, a revision of that file or document may be stored in the current form to have a record of revisions made, previous versions, and the like. In some examples, revisions or edits made may be stored in a log. Additionally or alternatively, a previous version of a file may be retrieved and restored, as desired.

In some arrangements, a new file or document may be generated from portions of previous versions. For instance, if four versions of a document exist, a new document may be generated including portions extracted from one or more of the four versions.

In some examples, dynamic controls may include one or more notarizing functions. For instance, in some examples, one or more machine learning datasets may be used to identify documents that may require a notary to sign or execute. In some examples, biometric data may be used to confirm that the user signing the document is the appropriate user and, responsive to that determination, the system may digitally notarize the document. In some examples, multiple forms of authentication of the user signing the document and the notary may be required to digitally notarize the document.

In some arrangements, dynamic controls may include one or more automatic proxy functions. For instance, one or more machine learning datasets may be used to identify a secondary or backup person to provide approval, notarize, review or the like. For instance, if an out of office message is detected for a user designated to approve, the one or more machine learning datasets may indicate that another user is often identified as a backup for the first user who is out of the office. Accordingly, the system may automatically route the request for information to the detected backup user.

In another example, the system may detect that the user from whom input is requested is not logged into the system, has been inactive for a predetermined amount of time, or the like. Accordingly, the system may automatically route the request for input to a second user. The second user may be designated as a backup to the user or may be identified from one or more machine learning datasets based on previous incidents.

In still other examples, information from one or more social media sites may be used to determine that a user might not be available to provide the requested input. For instance, if social media sites indicate that a user from whom input is requested is on vacation, at a conference, or the like, the system may automatically route the request for input to a second, backup user.

In some examples, the system may have pre-set rules for routing when a first user is determined to be unavailable or unlikely to be available. Additionally or alternatively, the automatic routing may be based on one or more machine learning datasets.

In step 209, the one or more identified dynamic controls may be implemented. For instance, implementing the one or more dynamic controls may include identifying information requested to fulfill the one or more dynamic controls, and holding the file (e.g., preventing transfer) until the one or more dynamic controls are fulfilled. For instance, in step 210, the file may be held in the file distribution control computer system 130. In some examples, the file may be held based on an instruction received from the dynamic file exchange control computing platform 110.

In step 211, the one or more dynamic controls may be transmitted to the file exchange portal computer system 120. For instance, the identified controls, as well as information requested to fulfill the controls, may be transmitted to the file exchange portal computer system 120 for distribution to one or more users (e.g., the user requesting the file transfer, users identified for approval, and the like).

With reference to FIG. 2C, in step 212, the one or more dynamic controls may be received by the file exchange portal computer system 130. In step 213, based on the received dynamic controls, one or more requests for additional information, approvals, or the like, may be generated. In step 214, the generated requests may be displayed to a user and/or transmitted to one or more user computer devices 150, 170, or the like.

In step 215, the one or more requests may be received by the user computer device(s) 150, 170 and/or displayed on the devices (e.g., via the portal). In step 216, user input may be received in response to the requests. The user input may include additional information, approvals, or the like. In step 217, the user input may be transmitted to the file exchange portal computer system 120 (e.g., may be entered from the user computing device and via the portal).

Figure 2D:
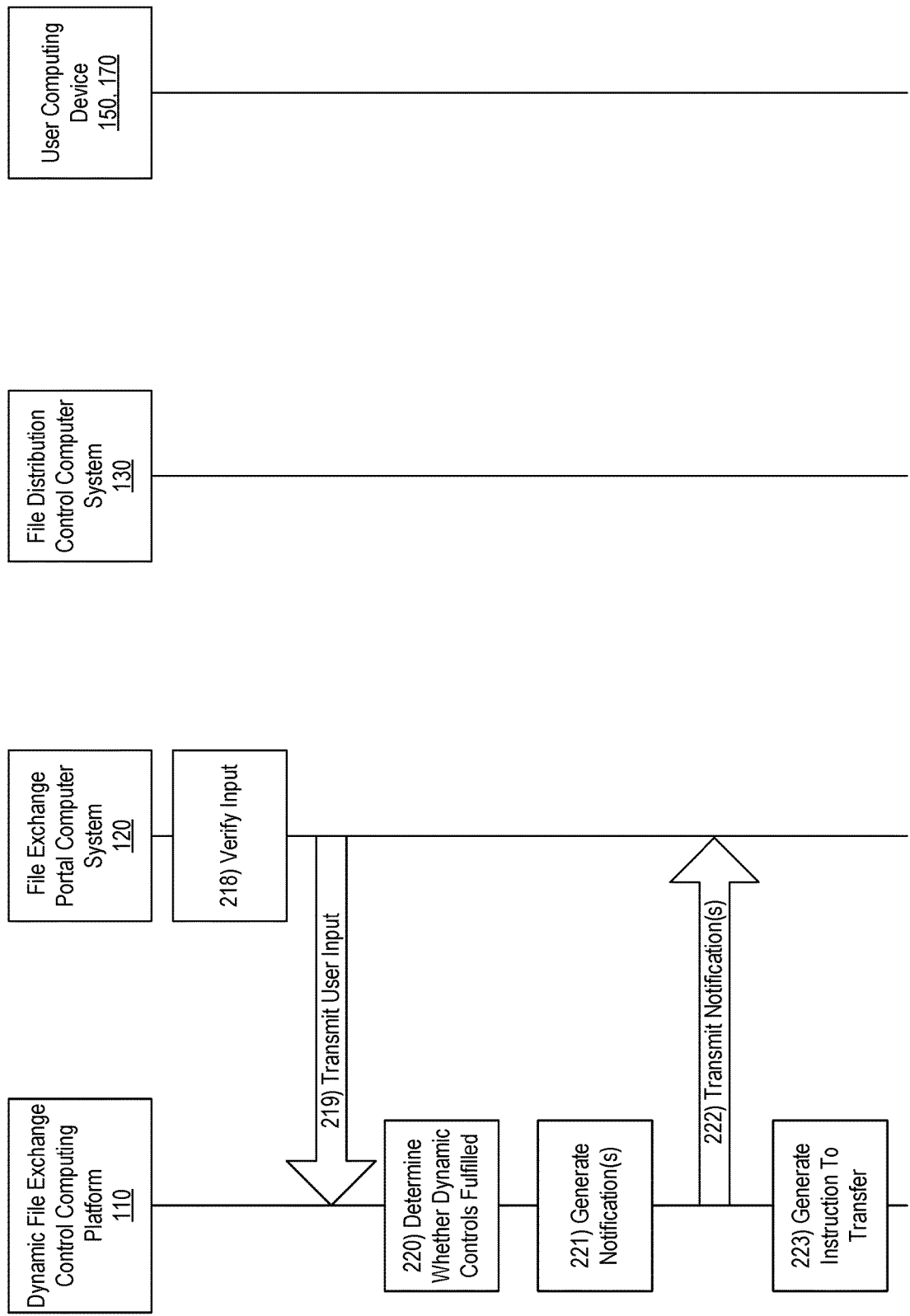

With reference to FIG. 2D, in step 218, the received user input may be verified. For instance, a user providing the input may be authenticated (e.g., via user credentials, biometric data, or the like). In other examples, the information received may be verified (e.g., that the approval is from a requested user, or the like).

In step 219, the received user input may be transmitted to the dynamic file exchange control computer platform 110. In step 220, the dynamic file exchange control computer platform 110 may determine whether the received user input fulfills the one or more dynamic controls implemented for the file.

In step 221, one or more notifications may be generated. The notifications may include an indication that the one or more dynamic controls have been fulfilled, that additional information is requested, or the like. In step 222, the one or more notifications may be transmitted to the file exchange portal computer system 130 for display or distribution to one or more users.

If the one or more dynamic controls are fulfilled, in step 223 an instruction, signal or command to transfer the file from a current location to the requested second location may be generated.

With reference to FIG. 2E, in step 224, the instruction, signal or command to transfer the file from the current location to the requested second location may be transmitted from the dynamic file exchange control computing platform 110 to the file distribution control computer system 130. In step 225, the instruction, signal or command may be executed and the file may be transferred.

Figure 3:
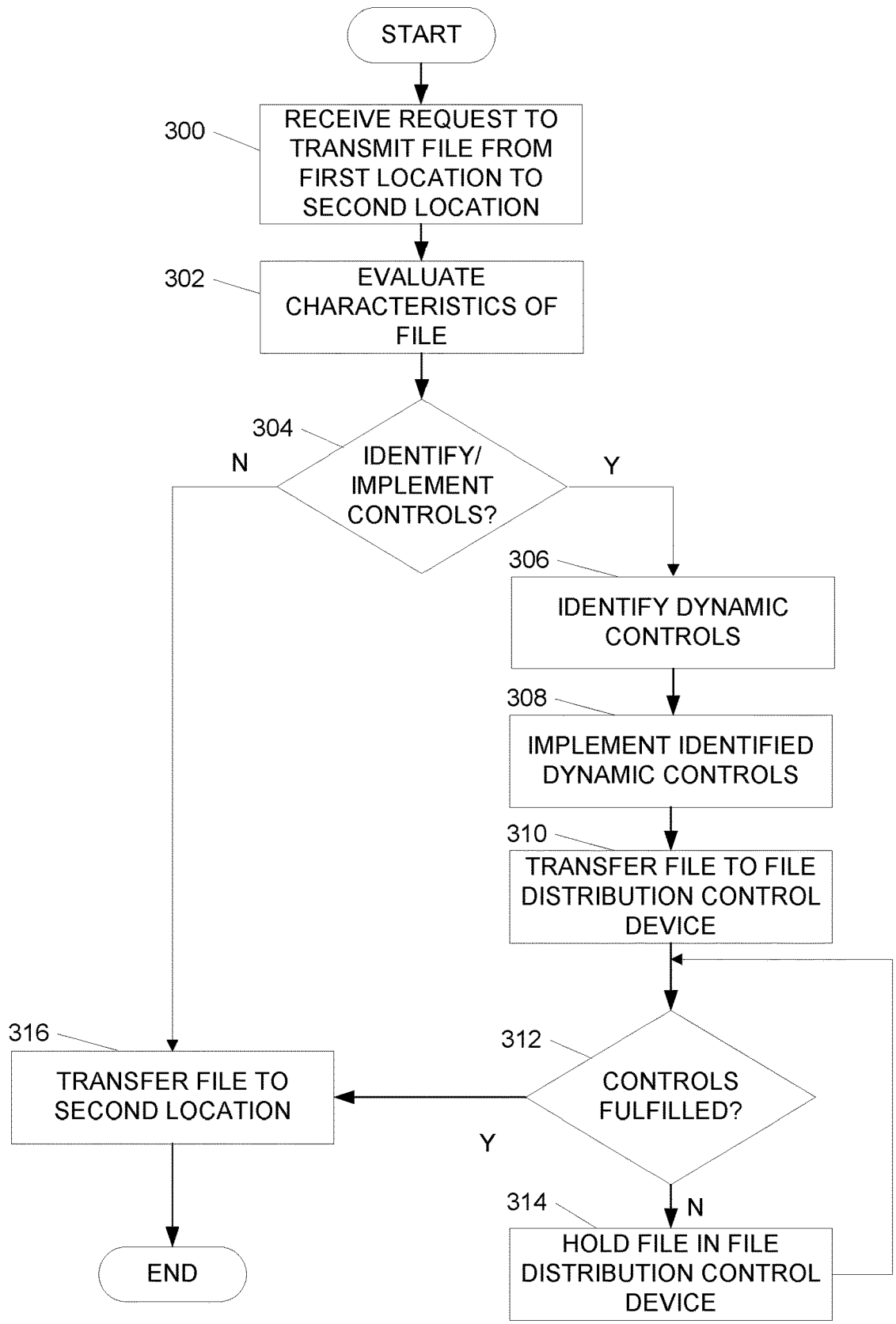
FIG. 3 depicts an illustrative method for implementing and using a system to perform dynamic file exchange control functions, according to one or more aspects described herein.

FIG. 3 is a flow chart illustrating one example method of implementing dynamic file exchange controls according to one or more aspects described herein. The processes illustrated in FIG. 3 are merely some example processes and functions. The steps shown may be performed in a different order, more steps may be added, or one or more steps may be omitted without departing from the invention.

In step 300, request to transmit a file from a first location to a second location may be received. In step 302, one or more characteristics of the file may be evaluated to determine whether one or more dynamic controls should be implemented. For instance, content of the file, metadata associated with the file, and the like, may be evaluated to determine whether dynamic controls should be implemented.

In step 304, a determination may be made as to whether one or more dynamic controls should be implemented. The determination may be based, in at least some examples, on the evaluation of the file (e.g., in step 302). In some examples, a document may be pre-registered with the system such that, upon receiving a request for a file transfer, a flag associated with the pre-registered file may be detected. In some examples, evaluating the file to make the determination may include determining whether one or more criteria to implement dynamic controls are met.

If, in step 304, a determination is made that one or more dynamic controls should not be implemented, the file may be transferred to the requested second location in step 316. If, in step 304, a determination is made that one or more dynamic controls should be implemented, in step 306, one or more dynamic controls to implement may be identified. For instance, as discussed herein, one or more machine learning datasets may be used to identify one or more dynamic controls to implement based on characteristics of the file, metadata associated with the file, users associated with the file, and the like.

In step 308, the identified one or more dynamic controls may be implemented. For instance, notification of the dynamic controls may be displayed or otherwise provided to one or more users and information requested to fulfill the one or more dynamic controls may be identified and/or requested.

In step 310, the file may be transferred from the first location to a file distribution control computing device to be held until the one or more identified dynamic controls are fulfilled. In some examples, transferring the file to the file distribution control computing device may be performed in response to determining that one or more dynamic controls should be implemented (e.g., in step 304).

In step 312, a determination may be made as to whether one or more identified dynamic controls are fulfilled. For instance, additional information may be received from one or more users, user devices, and the like. The information may be evaluated to determine whether it fulfills the one or more identified dynamic controls. If not, the file may be held in the file distribution control computing device in step 314 and the process may return to step 312 to determine whether the controls are fulfilled.

If, in step 312, a determination is made that the one or more identified dynamic controls are fulfilled, an instruction to transfer the file from the file distribution control computing device to the requested location may be generated, transmitted, and/or executed. In some examples, executing the transfer may further include generating a notification of the transfer. The notification may include an indication of the dynamic controls implemented, that the one or more dynamic controls were fulfilled and/or users who provided data to fulfill the dynamic controls, and the like. In some examples, the notification may be transmitted automatically to one or more regulatory agencies or governing bodies to act as a receipt of the implementation of the one or more dynamic controls.

As discussed herein, the arrangements described provide for dynamic, multi-level controls on one or more requested file transfers prior to the file being transferred to a requested location. By implementing one or more dynamic controls that must be fulfilled prior to releasing the file to be transferred to the requested location, the system may review and control requested file transfers to maintain privacy and data integrity while ensuring proper approvals are provided, regulatory requirements are met, and the like.

In some examples, one or more aspects described herein may be performed in real-time. For instance, a request for file transfer may be received in real-time and the file may be evaluated and one or more dynamic control functions (e.g., based on one or more machine learning datasets) may be identified and implemented in real-time. Accordingly, any delays associated with fulfilling the one or more dynamic control functions may be minimized by performing analysis functions in real-time or near real-time.

As discussed herein, aspects of the arrangements enable editing of documents to protect private or secure information, use of biometric data to verify identity, and the like. For instance, in some examples, a file for which a transfer has been requested may be tagged with biometric data of a user transmitting the file and a recipient of the file (e., a customer who has previously provided biometric data for authentication purposes). In some examples, the dynamic control functions may include verifying the identity of the transmitting user based on the biometric data, and requesting that the requested recipient provide biometric data that may then be matched to the biometric data tagged to the document. If there is a match, the dynamic control may be considered fulfilled and, in some examples, if no other dynamic controls are outstanding, the file may be transferred.

Further, in some examples, each dynamic control implemented may be controlled by a separate module in order to prevent mixing of data or allowing access to data to individuals who are not authorized to access the data. For instance, if multiple dynamic control functions are implemented, the determination of whether each one is fulfilled may be performed by a separate component or module of the dynamic file exchange control computing platform in order to avoid unauthorized combination of data or access to data.

Additionally or alternatively, data (e.g., files or the like) for which transfer is requested, may be received from multiple data sources (e.g., data feeds, data services, and the like). For instance, retrieval of a file, document, data, or the like, may including connecting to multiple sources points and one or more machine learning datasets may be used to identify appropriate or relevant documents, data, or the like, to be fed into the dynamic controls (e.g., identified for transfer or other modification). In some examples, the system may dynamically aggregate data from various sources to create or generate a resulting aggregated document for final processing.

As discussed above, in some arrangements, after a file is transferred (e.g., based on fulfilling the one or more dynamic controls) is may be evaluated, reviewed, or the like, by the receiving users. In some arrangements, the receiving user may transfer the file back to, for example, the first location from which the transfer was requested. In some examples, data may be received from multiple sources (e.g., multiple users evaluating the document or portions thereof) and may be used to recreate an original document (e.g., including any edits, modifications, or the like made by the user to whom the file was transferred, document in its original form or including all portions of the original form (e.g., and including any edits, modifications, or the like made by the user to whom the file was transferred) and/or to generate a new document mimicking the original document in content but including all edits, modifications, or the like, made by the one or more users to whom the file was transferred.

Figure 4:
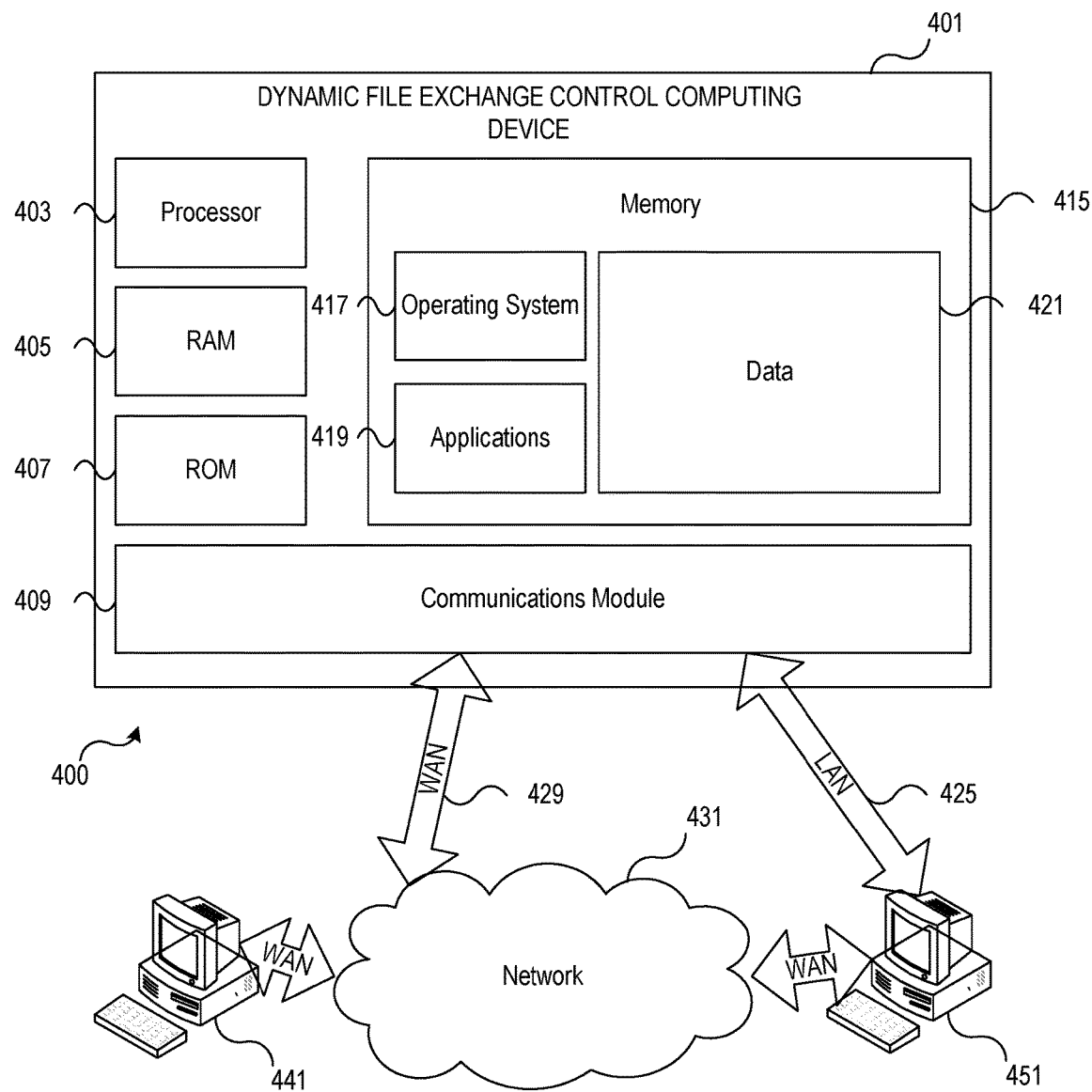
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic file exchange control computing device 401 having processor 403 for controlling overall operation of dynamic file exchange control computing device 401 and its associated components, including Random Access Memory (RAM) 405, Read-Only Memory (ROM) 407, communications module 409, and memory 415. Dynamic file exchange control computing device 401 may include a variety of computer readable media. Computer readable media may be any available media that may be accessed by dynamic file exchange control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic file exchange control computing device 401. Such a processor may execute computer-executable instructions stored on a computer-readable medium.

Software may be stored within memory 415 and/or storage to provide instructions to processor 403 for enabling dynamic file exchange control computing device 401 to perform various functions. For example, memory 415 may store software used by dynamic file exchange control computing device 401, such as operating system 417, application programs 419, and associated database 421. Also, some or all of the computer executable instructions for dynamic file exchange control computing device 401 may be embodied in hardware or firmware. Although not shown, RAM 405 may include one or more applications representing the application data stored in RAM 405 while dynamic file exchange control computing device 401 is on and corresponding software applications (e.g., software tasks) are running on dynamic file exchange control computing device 401.

Communications module 409 may include a microphone, keypad, touch screen, and/or stylus through which a user of dynamic file exchange control computing device 401 may provide input, and may also include one or more of a speaker for providing audio output and a video display device for providing textual, audiovisual and/or graphical output. Computing system environment 400 may also include optical scanners (not shown). Exemplary usages include scanning and converting paper documents, e.g., correspondence, receipts, and the like, to digital files.

Dynamic file exchange control computing device 401 may operate in a networked environment supporting connections to one or more remote computing devices, such as computing devices 441 and 451. Computing devices 441 and 451 may be personal computing devices or servers that include any or all of the elements described above relative to dynamic file exchange control computing device 401.

The network connections depicted in FIG. 4 may include Local Area Network (LAN) 425 and Wide Area Network (WAN) 429, as well as other networks. When used in a LAN networking environment, dynamic file exchange control computing device 401 may be connected to LAN 425 through a network interface or adapter in communications module 409. When used in a WAN networking environment, dynamic file exchange control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 5:
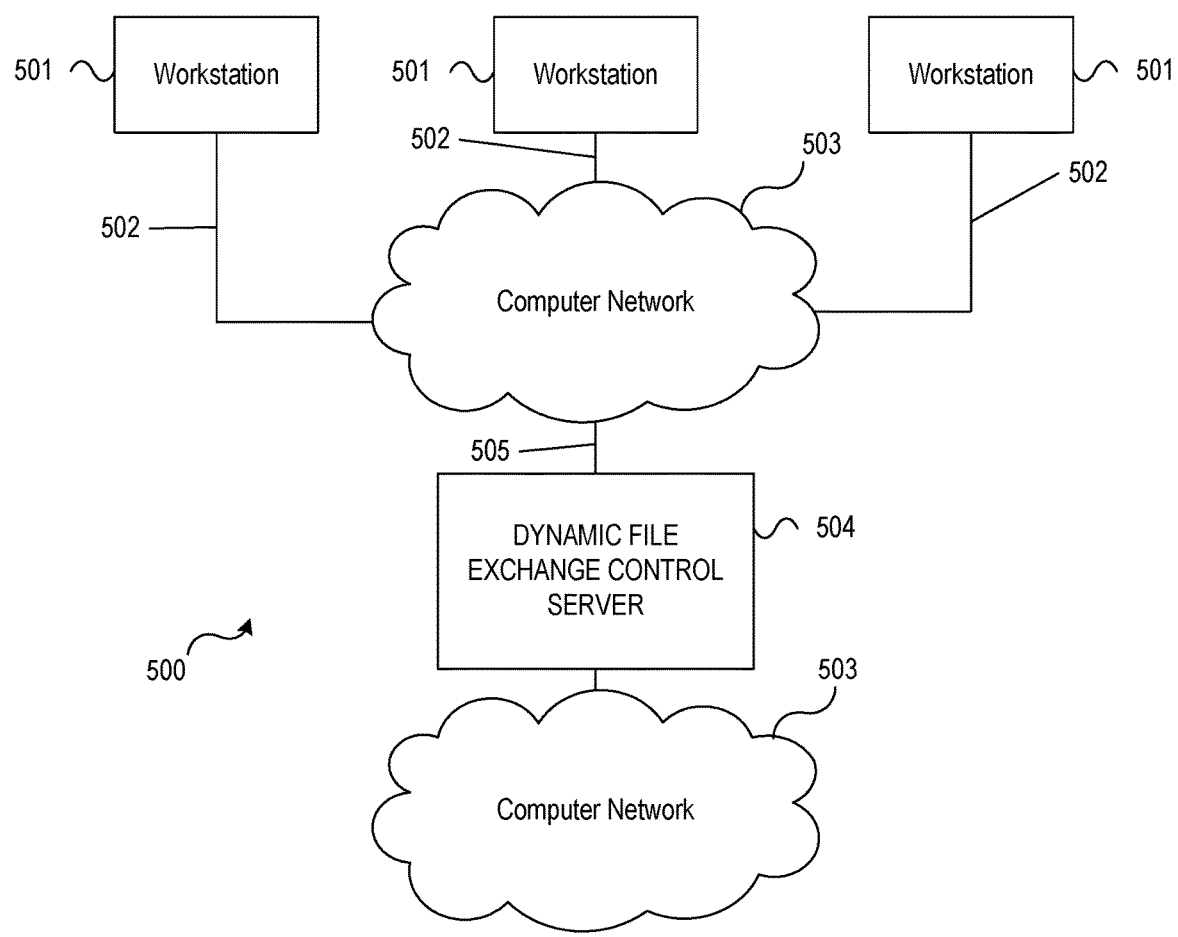
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to dynamic file exchange control server 504. In system 500, dynamic file exchange control server 504 may be a server, processor, computer, or data processing device, or combination of the same, configured to perform the functions and/or processes described herein. Server 504 may be used to process received requests, evaluate files, identify one or more dynamic controls, implement one or more dynamic controls, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and dynamic file exchange control server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic file exchange control computing platform, comprising:
    at least one processor;
    a communication interface communicatively coupled to the at least one processor; and
    memory storing computer-readable instructions that, when executed by the at least one processor, cause the dynamic file exchange control computing platform to:
        receive an instruction to transmit a file from a first location to a second location;
        prior to transmission of the file to the second location:
            evaluate the file to determine whether one or more criteria to implement dynamic controls are met, evaluating the file including evaluating metadata of the file to determine one or more characteristics of the file and identifying content of the file;
            responsive to determining, based on the characteristics determined from the metadata and the content of the file, that the one or more criteria to implement dynamic controls are met, transfer the file from the first location to a file distribution control computing device, the file distribution control computing device being different from the first location and the second location;
        hold the file at the file distribution control computing device;
        after transferring the file from the first location to the file distribution computing platform, identify, based on the characteristics determined from the metadata and the content of the file, one ore more dynamic controls, the one ore more dynamic controls including approval of the transmission of the file from at least two different individuals;
        implement the identified one or more dynamic controls;
        determine whether the identified one or more dynamic controls have been fulfilled;
        responsive to determining that the identified one or more dynamic controls have been fulfilled, generating and executing an instruction to transmit the file to the second location; and
        responsive to determining that the identified one or more dynamic controls have not been fulfilled, continuing to hold the file in the file distribution control computing device.

2. The dynamic file exchange control computing platform of claim 1, wherein determining whether the identified one or more dynamic controls have been fulfilled further includes receiving additional information and determining, based on the received additional information, whether the identified one or more dynamic controls are fulfilled.

3. The dynamic file exchange control computing platform of claim 1, wherein the identified one or more dynamic controls further include one or more automatic proxy functions including identification of a backup user to provide the approval.

4. The dynamic file exchange control computing platform of claim 1, wherein the identified one or more dynamic controls further include one or more editing functions.

5. The dynamic file exchange control computing platform of claim 1, wherein the identified one or more dynamic controls further include one or more functions associated with tracking revisions and providing auditing functions.

6. The dynamic file exchange control computing platform of claim 1, wherein the identified one or more dynamic controls are identified based on one or more machine learning datasets.

7. The dynamic file exchange control computing platform of claim 6, further including instructions that, when executed, cause the dynamic file exchange control computing platform to:
    extract the metadata from the file; and
    compare the metadata to the one or more machine learning datasets to identify the one or more dynamic controls.

8. A method, comprising:
at a computing platform comprising at least one processor, memory, and a communication interface:
    receiving, by the at least one processor and via the communication interface, an instruction to transmit a file from a first location to a second location;
    prior to transmission of the file to the second location:
        evaluating, by the at least one processor, the file to determine whether one or more criteria to implement dynamic controls are met, evaluating the file including evaluating metadata of the file to determine one or more characteristics of the file and identifying content of the file;
        responsive to determining, based on the characteristics determined from the metadata and the content of the file, that the one or more criteria to implement dynamic controls are met
        transferring, by the at least one processor and via the communication interface, the file from the first location to a file distribution control computing device, the file distribution control computing device being different from the first location and the second location;

hold the file at the file distribution control computing device;

after transferring the file from the first location to the file distribution computing platform, identify, based on the characteristics determined from the metadata and the content of the file, one or more dynamic controls, the one or more dynamic controls including approval of the transmission of the file from at least two different individuals;

implement the identified one or more dynamic controls;

determining, by the at least one processor, whether the identified one or more dynamic controls have been fulfilled; and responsive to determining that the identified one or more dynamic controls have been fulfilled, generating and executing, by the at least one processor, an instruction to transmit the file to the second location.

9. The method of claim 8, wherein determining whether the identified one or more dynamic controls have been fulfilled further includes receiving additional information and determining, based on the received additional information, whether the identified one or more dynamic controls are fulfilled.

10. The method of claim 8, wherein the identified one or more dynamic controls include one or more automatic proxy functions including identification of a backup user to provide the approval.

11. The method of claim 8, wherein the identified one or more dynamic controls further include one or more editing functions.

12. The method of claim 8, wherein the identified one or more dynamic controls further include one or more functions associated with tracking revisions and providing auditing functions.

13. The method of claim 8, wherein the identified one or more dynamic controls are identified based on one or more machine learning datasets.

14. The method of claim 13, further including:

extracting, by the at least one processor, the metadata from the file; and comparing, by the at least one processor, the metadata to the one or more machine learning datasets to identify the one or more dynamic controls.

15. One or more non-transitory computer-readable media storing instructions that, when executed by a computing platform comprising at least one processor, memory, and a communication interface, cause the computing platform to:

receive an instruction to transmit a file from a first location to a second location;

prior to transmission of the file to the second location:

evaluate file to determine whether one or more criteria to implement dynamic controls are met, evaluating the file including evaluating metadata of the file to determine one or more characteristics of the file and identifying content of the file;

responsive to determining, based on the characteristics determined from the metadata and the content of the file, that the one or more criteria to implement dynamic controls are met, transfer the file from the first location to a file distribution control computing device, the file distribution control computing device being different from the first location and the second location, hold the file at the file distribution control computing device;

after transferring the file from the first location to the file distribution computing platform, identify, based on the characteristics determined from the metadata and the content of the file, one or more dynamic controls, the one or more dynamic controls including approval of the transmission of the file from at least two different individuals;

implement the identified one or more dynamic controls;

determine whether the identified one or more dynamic controls have been fulfilled;

responsive to determining that the identified one or more dynamic controls have been fulfilled, generating and executing an instruction to transmit the file to the second location; and responsive to determining that the identified one or more dynamic controls have not been fulfilled, continuing to hold the file in the file distribution control computing device.

16. The one or more non-transitory computer-readable media of claim 15, wherein determining whether the identified one or more dynamic controls have been fulfilled further includes receiving additional information and determining, based on the received additional information, whether the identified one or more identified dynamic controls are fulfilled.

17. The one or more non-transitory computer-readable media of claim 15, wherein the identified one or more dynamic controls further include one or more automatic proxy functions including identification of a backup user to provide the approval.

18. The one or more non-transitory computer-readable media of claim 15, wherein the identified one or more dynamic controls include one or more editing functions.

19. The one or more non-transitory computer-readable media of claim 15, wherein the identified one or more dynamic controls are identified based on one or more machine learning datasets.

20. The one or more non-transitory computer-readable media of claim 19, further including instructions that, when executed, cause the computing platform to:

extract the metadata from the file; and compare the metadata to the one or more machine learning datasets to identify the one or more dynamic controls.

* * * * *

UNITED STATES PATENT AND TRADEMARK OFFICE
CERTIFICATE OF CORRECTION

PATENT NO. : 10,462,208 B2
APPLICATION NO. : 15/646176
DATED : October 29, 2019
INVENTOR(S) : Kurian et al.

It is certified that error appears in the above-identified patent and that said Letters Patent is hereby corrected as shown below:

In the Claims

Column 20, Line 1:
In Claim 1, delete "ore" and insert --or--

Column 20, Line 2:
In Claim 1, delete "ore" and insert --or--

Column 21, Line 56:
In Claim 15, after "evaluate", insert --the--

Column 22, Line 6:
In Claim 15, after "met,", delete "¶"

Column 22, Line 10:
In Claim 15, delete "location," and insert --location;--

Column 22, Line 45:
In Claim 18, after "controls", insert --further--

Signed and Sealed this
Twelfth Day of January, 2021

Andrei Iancu
*Director of the United States Patent and Trademark Office*